United States Patent
Treible, Jr.

[15] 3,664,183
[45] May 23, 1972

[54] WORK MEASUREMENT SYSTEM

[72] Inventor: Edwin S. Treible, Jr., Ringoes, N.J.
[73] Assignee: Ingersoll-Rand Company, New York, N.Y.
[22] Filed: June 22, 1970
[21] Appl. No.: 48,019

[52] U.S. Cl. ................................................73/133, 73/206
[51] Int. Cl. .........................................................G01l 23/00
[58] Field of Search ................... 418/43, 1; 91/1; 73/95, 206, 73/227, 133, 112, 197; 324/103; 235/61 C, 61 D

[56] References Cited

UNITED STATES PATENTS

| 2,402,972 | 7/1946 | Mitchell | 418/43 |
| 2,700,134 | 1/1955 | Stewart | 324/103 |
| 2,724,967 | 11/1955 | Gehre | 73/197 |
| 2,943,484 | 7/1960 | Harrington | 73/197 |
| 3,421,414 | 1/1969 | Peale | 91/458 |

OTHER PUBLICATIONS

Cohcrane Flowmeters, 10/9/36, pg. 8.
Bristol Metameters, 8/5/41, pg. 16.
General Electric Bulletin 4720 1/1910, pgs. 1– 3, 6, 7, 11.

*Primary Examiner*—Jerry W. Myracle
*Attorney*—David W. Tibbott and Frank S. Troidl

[57] ABSTRACT

A method and apparatus for measuring the work performed by a governed air-powered tool and including a flow and integrated meter for measuring the amount of air supplied to the tool. The method limits the measurement of the air flow to periods when such air flow is above a predetermined minimum magnitude which generally will be a small amount above the air consumption of the tool when running free and not performing work.

7 Claims, 3 Drawing Figures

PATENTED MAY 23 1972 3,664,183

INVENTOR
EDWIN S. TREIBLE, JR.
BY
David W. Tibbott
ATTORNEY

3,664,183

WORK MEASUREMENT SYSTEM

BACKGROUND OF THE INVENTION

This invention relates generally to a method and apparatus for measuring the work performed by an air-powered tool and more particularly to the work performed by a governed air-powered tool.

Certain industries today pay their craftsmen on the basis of the amount of work performed by a man. This incentive wage system is popular with workmen because it enables them to increase their income by working harder. A conventional work measurement system using portable tools such as grinders includes the use of an electrically powered grinder and means for measuring the amount of electrical power consumed by the tool. The use of electrical power by the tool is related to the amount of work performed by the operator and therefore his wages can be based on the amount of electrical power consumed by the tool.

Heretofore, no similar work measurement system existed for the use of air-powered tools and, as a result, many industries have been forced to use electrically powered tools, with all of the usual handicaps and disadvantages of electrical tools.

SUMMARY OF THE INVENTION

The primary object of this invention is to provide a method and apparatus for measuring the work performed by a governed air-powered tool.

Other important objects are to provide a system for using air-powered tools which can be used as a basis for a wage incentive program; and to provide a means for automatically measuring the use or operation of an air-powered tool.

In general, the above objects are attained in an apparatus including a flow and integrating meter for measuring the amount of air supplied to an air tool and having a means operative to activate and deactivate the meter when the air flow rises above and falls below a predetermined magnitude. Generally, the predetermined magnitude of air flow will be a little more than the normal air consumption of the tool when it is idling, running free, and not performing any work. In general, the air consumption of a governed air tool rises more or less linearly as the work performed by the tool increases.

BRIEF DESCRIPTION OF THE DRAWINGS

The invention is described in connection with the accompanying drawing wherein.

DESCRIPTION OF PREFERRED EMBODIMENT

Figure 1:
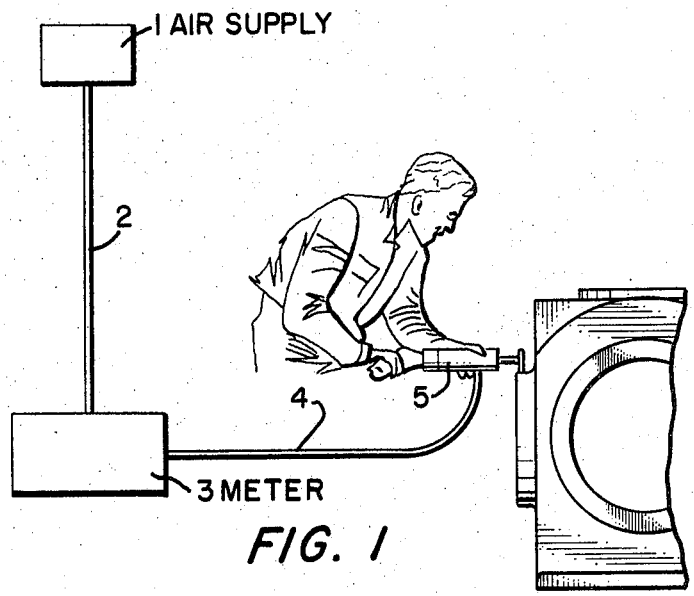
FIG. 1 is a schematic drawing of the work measurement apparatus of the invention and showing an air-powered grinder being operated.

FIG. 1 illustrates an air supply 1 connected by a conduit 2 to a flow and integrator meter 3 which is connected by a hose 4 to an air-powered grinder 5. The grinder 5 is governed to limit its speed. Governed air grinders are well known in the art; an example of a governed air grinder is disclosed in U.S. Pat. No. 3,421,414.

It has been found that the rate of air consumed by a governed air grinder increases generally at a linear rate as the load (torque) on the grinder increases. This relationship is shown in the curve 6 in FIG. 2 wherein the vertical coordinate measures the air consumption in cubic feet per minute (CFM) and the abscissa measures the load in foot pounds. Due to the discovery of the linear relationship between air consumption and load on a governed air tool, it has been determined that this relationship can be used to provide a measure of the work performed by the air tool.

The flow meter 3 is a modified commercial air flow-integrator meter. Originally, it totalized all of the air flowing through it, and it has been modified so that now it only totals the air flow when the flow is at or above a predetermined flow rate. As an example, I used a meter made by Fischer & Porter Company, Warminster, Pennsylvania 18974, called a "Flowrator Meter" with an "Integrator", Model No. 10A1152A-OK–1401A20 "Flowrator" with a Model No. 52T–4000 "Integrator". The Integrator of this meter has a cam which activates the integrator at the start of air flow through the motor. I modified this cam so that the integrator is not activated until the flow through the meter exceeds a selected minimum value. It also deactivates the meter with excessive air flows such as if the air supply hose 4 is disconnected.

Figure 2:
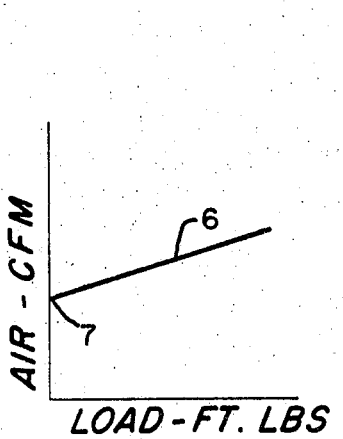
FIG. 2 is a curve showing the air consumption of a governed air grinder in relation to the load on the grinder.

A governed air tool such as a grinder has a minimum rate of air consumption when running at free speed (under no load). In FIG. 2, this is the low point on the curve indicated by the reference number 7. At this point on the curve, the tool is not doing work, and therefore, it is not desirable for the meter 3 to measure or totalize the air flow. In other words, the operator is simply allowing the tool 5 to run free, without being loaded, and should not be paid an incentive wage for this type of operation.

Figure 3:
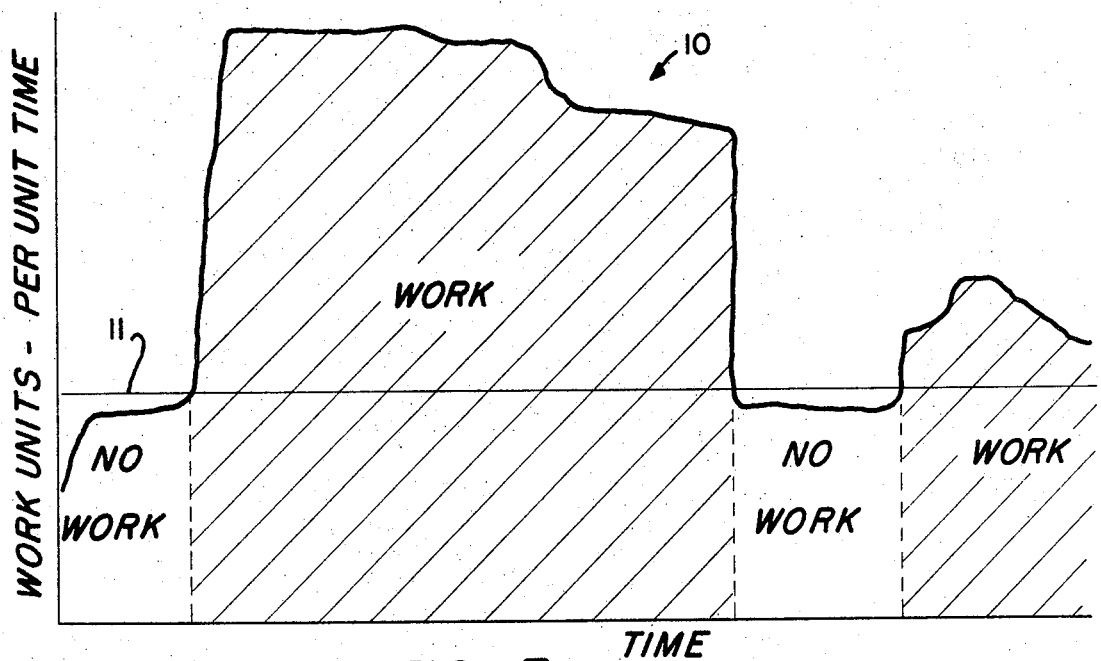
FIG. 3 is an example of a curve for the apparatus of FIG. 1 showing the work performed over a period of time.

The meter 3 is set to begin measuring or integrating the air flow as soon as the air consumption of the tool rises a small amount above the flow at free speed. This type of operation is shown in the curve 10 in FIG. 3. In this curve, the vertical coordinate measures the air consumption rate (standard cubic feet per minute, SCFM) and is termed "Work Units per Unit Time" and the horizontal coordinate or abscissa measures time. The air consumption rate is broadly termed "Work Units" in order to emphasize the nature of the measured quantity and its relationship to "work". It should be understood that the integration of "work units per unit time" with "time" equals a measure of the "work" performed by the tool. The amount of work performed by the tool is shown in FIG. 3 by the hatched areas beneath the curve 10. An operator can be paid an incentive wage on the basis of these hatched "work" areas. The non-hatched areas, labeled "no work" are not measured by the meter 3 and, thus, are eliminated or separated from the "work" areas.

In FIG. 3, the horizontal line 11 indicates the level of energy units which activates the meter 3 to start measuring the "work". This line 11 is placed slightly above the energy consumption of the tool at no-load speed; hence, the meter 3 will not begin measuring the work until the tool 5 is at least slightly loaded by the operator pressing it against a surface.

It should be recognized that I have provided a system for directly measuring the work performed by an air tool and that the measurement of work provided by this system can be used as the basis of a wage incentive program.

ALTERNATE METHODS

The invention of the foregoing apparatus and method also resulted in the conception of several alternate methods for developing or determining a measure of work which can be used in a work incentive wage system. These alternate methods involve the combination of certain measurements plus one or more mental acts in order to obtain a value or measure of work which can be used in the incentive payment system.

In each of the following methods, the operator may measure or integrate the total air consumption of an air tool, during both working and non-working (no load) periods, and the total operating time of the tool. These measurements can be obtained by a simple integrating meter and a timer attached to the air supply hose of the tool.

In one alternate method, in addition to the measurement of the total air consumption, it is necessary to measure the time that the tool is operating under no-load (non-working period). The air consumption rate of the tool while under no load (operating at free speed) is multiplied by the operating time while under no load and the product is subtracted from the total air consumption measurement to provide a remainder equaling the work performed by the operator. This first alternate method does not require the measurement of the total operating time of the tool. In effect, this first alternate method provides substantially the same measurement of work that is shown in FIG. 3 by the cross-hatched areas labeled "work". It will be understood that the air consumption rate of the tool at no-load is the rate shown in FIG. 3 by the line 11.

A second alternate method is to measure the time that the tool is working (under a load) and this measurement is subtracted from the total operating time of the tool. The remainder equals the time that the tool is operating under no load. At this point, the second alternate method follows the same steps as the above first alternate method.

Under the third alternate method, the total operating time of the tool is multiplied by the air consumption rate of the tool while under no load and this product is subtracted from the measurement of the total air consumption of the tool to provide a measurement or value of work which is different from the figure obtained by the foregoing methods but which can also be used as a basis for a wage incentive system. In this third alternate method, the work result, looking at FIG. 3, is equivalent to the integrated work located above the line 11, which represents the air consumption rate of the tool when working at free speed and under no load. In other words, in this third alternate method, all of the air consumption of the tool below the line 11 is subtracted to leave only the work located above the line 11. Although this measurement of work is different from the foregoing methods, it has been determined that this figure can be used a a basis for the payment of wages under a wage incentive system.

Although several embodiments of the present invention have been shown and described, it should be understood that this invention is not limited thereto except by the scope of the claims. Various modifications and changes can be made without departing from the scope and spirit of the invention.

I claim:

1. An apparatus for measuring the work performed by a governed air-powered tool comprising:
   a governed air-powered tool connected to an air supply passage including a hose;
   a flow and integrating meter connected in the air supply passage of the tool and operative to the measure the amount of air flowing to said tool during the operation of said tool; and
   means for deactivating said meter when the air flow to said tool drops below a predetermined magnitude and for reactivating said meter when said air flow rises above said predetermined magnitude, said predetermined magnitude being near the amount of air consumed by the tool when running at free speed and not performing work whereby the amount of air measured by the meter is a measure of the work performed by the tool during periods that it is operating under a load and performing work.

2. The apparatus of claim 1 wherein:
   said tool is an air-powered grinder.

3. The apparatus of claim 1 including:
   means for deactivating said meter if the air flow rises above a predetermined magnitude, such as might occur if the hose supplying such tool is broken or disconnected.

4. A method of measuring the work performed by a governed air-powered tool comprising:
   operating a governed air tool from an air supply; and
   measuring and obtaining the magnitude of the amount of air used by the tool during periods that the air flow to the tool exceeds a predetermined minimum air flow which is the normal air flow to the tool while running without a load.

5. The method of claim 4 including:
   performing said measurement step with a flow and integrating meter operative to measure the total amount of air flowing to the tool during periods that the tool is operating under load and to cease measuring such air flow when the tool is not operating under load.

6. The method of claim 4 including:
   measuring the total amount of air consumed by the tool during both working and non-working periods of the tool and subtracting from this measurement the air consumed by the tool while operating without a load.

7. The method of claim 4 including:
   measuring the total amount of air consumed by the tool during both working and non-working periods and subtracting from this measurement the product of the total operating time of the tool multiplied by the air consumption rate of the tool while operating without a load.

* * * * *